(12) United States Patent
Matsushita et al.

(10) Patent No.: US 7,491,051 B2
(45) Date of Patent: Feb. 17, 2009

(54) MOLD CLAMPING APPARATUS, INJECTION MOLDING MACHINE AND INJECTION MOLDING METHOD

(75) Inventors: Hiroto Matsushita, Nagoya (JP); Hiroshi Terayama, Nagoya (JP); Naoki Katoh, Nagoya (JP); Ayumi Sakamoto, Suzuka (JP); Shinji Yasuda, Minato-ku (JP); Sadao Mori, Sayama (JP)

(73) Assignees: Mitsubishi Heavy Industries Plastic Technology Co., Ltd., Aichi-ken (JP); Honda Motor Co., Ltd., Tokyo (JP)

( * ) Notice: Subject to any disclaimer, the term of this patent is extended or adjusted under 35 U.S.C. 154(b) by 45 days.

(21) Appl. No.: 11/667,679

(22) PCT Filed: Apr. 19, 2006

(86) PCT No.: PCT/JP2006/008186

§ 371 (c)(1),
(2), (4) Date: May 14, 2007

(87) PCT Pub. No.: WO2006/115141

PCT Pub. Date: Nov. 2, 2006

(65) Prior Publication Data

US 2007/0269549 A1 Nov. 22, 2007

(30) Foreign Application Priority Data

Apr. 25, 2005 (JP) .............................. 2005-126202

(51) Int. Cl.
*B29C 45/64* (2006.01)

(52) U.S. Cl. ...................... 425/190; 264/328.9; 425/595

(58) Field of Classification Search ................. 425/190, 425/451.9, 589, 595; 264/328.1, 328.9
See application file for complete search history.

(56) References Cited

U.S. PATENT DOCUMENTS

| 5,114,329 A | * | 5/1992 | Nakamura et al. ........... 425/190 |
| 5,516,276 A | * | 5/1996 | Takayama et al. ........... 425/589 |
| 5,776,402 A | * | 7/1998 | Glaesener ................. 264/328.9 |

FOREIGN PATENT DOCUMENTS

| JP | 1-18339 Y2 | 5/1989 |
| JP | 8-258103 A | 10/1996 |

(Continued)

*Primary Examiner*—James Mackey
(74) *Attorney, Agent, or Firm*—Birch, Stewart, Kolasch & Birch, LLP

(57) ABSTRACT

Provided is a mold clamping apparatus of a mold having a side wall portion of cantilever shape, by which deformation of the mold side wall portion can be efficiently suppressed. An injection molding machine and injection molding method both using the mold clamping apparatus are also provided. Thereby, molded articles with high quality having no flash generation can be obtained. The mold clamping apparatus comprises a side pusher comprising a pair of supports respectively arranged between adjacent two tie bars out of a plurality of tie bars at positions symmetrical to each other and slidably supported to the tie bars, a moving and positioning means linking the supports to a fixed platen or movable platen and moving the supports to be positioned at a predetermined position and a lateral clamping means provided on each of the pair of supports to push a side face of a fixed mold or movable mold.

20 Claims, 11 Drawing Sheets

FOREIGN PATENT DOCUMENTS

| | | |
|---|---|---|
| JP | 8-276436 A | 10/1996 |
| JP | 9-38984 A | 2/1997 |
| JP | 2587035 Y2 | 10/1998 |
| JP | 2858647 B2 | 12/1998 |
| JP | 2001-1381 A | 1/2001 |
| JP | 2003-25378 A | 1/2003 |

* cited by examiner (a)

(b)

MOLD CLAMPING APPARATUS, INJECTION MOLDING MACHINE AND INJECTION MOLDING METHOD

TECHNICAL FIELD

The present invention relates to a mold clamping apparatus used for an injection molding machine, die casting machine or the like that has a pair of molds to be opened and closed for producing molded articles as well as relates to an injection molding machine and injection molding method both using the mold clamping apparatus.

BACKGROUND OF THE INVENTION

FIG. 12 shows a mold clamping apparatus used for a prior art injection molding machine. In the figure, a mold clamping apparatus 101 comprises a base frame 102, fixed die plate (platen) 105 fixedly mounted on the base frame 102 and fitted with a fixed mold 103, movable die plate (platen) 111 movably provided in the right and left directions in the figure on a rail 107 by action of a hydraulic cylinder 113 and plurality of tie bars 115 that can link together the fixed die plate 105 and movable die plate 111. The fixed die plate 105 has therein a hydraulic cylinder 117 for mold clamping concentrically provided with each of the tie bars 115. Each of the tie bars 115 has its one end fitted with a ram 119 of the hydraulic cylinder 117.

Function of the mold clamping apparatus 101 will be described. First, the movable die plate 111 is moved to a position shown by two dotted chain lines in the figure by action of the hydraulic cylinder 113 for mold opening and closing to thereby cause the movable mold 109 to abut on the fixed mold 103. Next, an external thread portion (link portion) 121 of each of the tie bars 115 and a half nut 123 fitted to the movable die plate 111 are caused to engage with each other to thereby fix the movable die plate 111 to the tie bars 115. Then, pressure of working fluid in the hydraulic cylinder 117 is elevated so that the fixed mold 103 and movable mold 109 are pressed against each other at a mold mating face. Thus, a mold clamping is completed and a molten resin is injected into a cavity in the mold from an injection unit 125 so that a molded article is produced.

Here, there are shortcomings, as follows, in the above-mentioned mold clamping apparatus. That is, as shown in FIG. 13, when the fixed mold 103 and movable mold 109 are clamped together by the hydraulic cylinder 117 supplied with the high pressure working fluid, a large tensile load T acts on each of the tie bars 115 and thereby the fixed die plate 105 and movable die plate 111 are bent by force F as shown by broken lines there. This often generates a small gap S at the contact face between the fixed mold 103 and movable mold 109 and there is a possibility that the gap S causes a resin leakage or forms molding flashes on the molded articles. Especially, in case of a large size mold clamping apparatus, as the cavity volume in the mold is large, this tendency becomes evident.

This problem may be solved by increasing a die plate thickness so as to suppress the above-mentioned bending of the die plate but, on the other hand, weight of the die plate becomes large and this invites a manufacturing problem and an increase of manufacturing cost. Moreover, the heavier weight causes a transportational problem.

In order to solve these problems, in a mold clamping apparatus of the below-mentioned Patent Document 1, a supporting mechanism comprises a first element to fix separately arranged end portions of tie bars to each other and a second element to connect a central portion of a stationary platen to the end portions of the tie bars with a certain angle relative to a plane of the stationary platen and the stationary platen is fitted to the tie bars via the supporting mechanism, wherein a protruding end of the second element of the supporting mechanism supports the central portion of the stationary platen or supports the stationary platen within a projected plane of a fitting face of the mold. Thereby, even if a mold having a small fitting area is used, generation of flexure of the stationary platen is prevented. However, the supporting mechanism of this Patent Document 1 is complicated and there is a possibility that the manufacturing cost becomes high.

In a mold clamping apparatus of the below-mentioned Patent Document 2, a clamping force conveying portion conveying a clamping force from a hydraulic cylinder to a mold fixing member is so formed that an outer periphery of a conveying face of the clamping force conveying portion is positioned on the inner side of an outer periphery of a force receiving face of the mold fixing member. By so forming the clamping force conveying portion relative to the mold fixing member, the clamping force is conveyed not to the outer peripheral portion of the mold fixing member but to a central axis side of the mold fixing member. Thereby, strain of the mold fixing member, especially strain of the central side of the mold fixing member, can be reduced and the movable mold and fixed mold can be securely clamped together so that no small gap is generated. Nevertheless, in the Patent Document 2, no concrete construction of the die plate (platen) is disclosed.

Also, in a mold clamping apparatus of the below-mentioned Patent Document 3, such a light weight type fixed platen is disclosed as to have a fixed mold supporting body portion comprising a boss portion, surrounding frame portion, radial ribs connecting together the boss portion and frame portion and mold fitting wall. This fixed platen could be considered to be used as a fixed die plate for the mold clamping apparatus of the Patent Document 2. However, in case of the fixed platen as so constructed, if it is clamped by the tie bars, the fixed platen will be bent and the force acting on the connecting ribs at that time becomes stress acting in the tension direction.

Usually, an allowable stress of materials corresponding to the stress in the tension direction is small as compared with an allowable stress acting in the compression direction. For this reason, thickness of the connecting ribs cannot be made smaller and an optimal weight alleviation cannot be realized.

Moreover, in a mold clamping apparatus of the below-mentioned Patent Document 4, a mold fitting wall is supported by an arch-shaped or C or V-shaped intermediate supporting structure or a conical or spherical intermediate supporting structure. When a fixed mold and movable mold are clamped together, force generated on a mold mounting face is dispersed outward (toward a tie bar side) by the intermediate supporting structure so that the mold mounting face may not be ununiformly flexed. However, the die plate (platen) structure used for the mold clamping apparatus of the Patent Document 4 has a special shape. Hence, manufacture thereof is difficult and there is a problem to invite a high manufacturing cost.

In addition to the above-mentioned problems, recently, there is a tendency that molded articles produced by injection molding become large in size and structures thereof become complicated and in case of molding an automobile bumper or the like, for example, there is seen a new kind of problem of "mouth opening" generated by a lateral directional deformation of the mold side wall.

FIG. 14 is an explanatory view of this problem. In FIG. 11, numeral 150 designates a schematically illustrated automobile bumper, wherein a front face portion 150*a* has its both ends bent nearly with a right angle and fitted with side face portions 150*b* extending comparatively long, so that when seen from above, a plan view of the bumper is a C-shaped form. Numeral 151 designates a female mold as the fixed mold (see 103 in FIG. 13) fitted to the fixed die plate (see 105 in FIG. 13), wherein a front portion 151*a* of rectangular shape and side wall portions 151*b* bending nearly With a right angle on both ends of the front portion 151*a* are formed. Numeral 152 (shown by two dotted chain lines) designates a male mold (movable mold) forming a pair of molds together with the female mold 151. A seat plate for fitting the male mold 152 on the lower left hand side is omitted in the illustration.

In case where a molded article is to be produced by injection molding using such a mold, when a molten resin is injected into a cavity in the mold (that is, a space occupied by the bumper 150 in the figure), the mold receives an outward pressure from the resin. Thereby, the side wall portion 151*b* of the female mold 151 has its both terminal end sides deformed (on the lower left hand side in the figure), as exaggeratedly shown by two dotted chain lines, to open outward in the right and left directions, so that a gap of triangular shape (mouth opening) is generated at the contact face with the male mold 152. For this reason, thickness of the side face portion 150*b* of the molded bumper 150 is increased and flashes are generated by the resin leaking into a gap 153 formed in upper and lower portions of the side face portion 150*b*.

As this deformation quantity is small, while the thickness increase of the bumper 150 is not very problematic, there is a problem in that much work is required for removal of the flashes. Usually, while the mold is manufactured with a sufficient strength, as the side wall portion 151*b* of the female mold 151 long projects from the front portion 151*a* in a cantilever form, the bending deformation becomes large. Hence, by increasing the thickness so as to further enhance the rigidity, the deformation can be prevented. Nevertheless, if a rigidity design is to be sought, the mold becomes large and there will arise other problems.

(Patent Document 1) Japanese laid-open patent application 1996-258103
(Patent Document 2) Japanese laid-open patent application 2001-1381
(Patent Document 3) Japanese laid-open patent application 2003-25378
(Patent Document 4) Japanese patent 2858647

DISCLOSURE OF THE INVENTION

In order to solve the problems in the prior art as mentioned above, a first object of the present invention is to provide a mold clamping apparatus that, even if a mold having its both sides formed with side wall portions of a cantilever form, as mentioned above, is used, (1) uses no means to increase a mold thickness for enhancing the rigidity to thereby avoid a weight increase of the mold, (2) is applicable to molds of different molded articles, (3) can be operated without obstruction even at the time of mold exchange and still (4) can securely prevent a flash generation on both sides of the mold.

Another object of the present invention is to provide a mold clamping apparatus by which, in addition to the above-mentioned object, a die plate of high rigidity and light weight is realized and concurrently the problem of mouth opening occurring at the contact face between the fixed mold and movable mold when the mold is clamped can be suppressed.

A further object of the present invention is to provide an injection molding machine and injection molding method by which resin leakage from the mold contact face is prevented so that flash generation on both side portions of the mold is prevented and resin molded articles with a high quality and high accuracy can be efficiently produced.

In order to achieve the above-mentioned objects, a first invention provides a mold clamping apparatus comprising: a fixed platen fixed to a base, a movable platen arranged, being opposed to the fixed platen, to be movable forward and backward, a plurality of tie bars making the fixed platen and movable platen linkable to each other, a mold clamping means causing a tensile force to act on the tie bars to clamp together a mold comprising a fixed mold fitted to the fixed platen and a movable mold fitted to the movable platen and a side pusher comprising a pair of supports respectively arranged between adjacent two tie bars out of the plurality of tie bars at positions symmetrical to each other and slidably supported to the tie bars, a moving and positioning means linking the supports to the fixed platen or movable platen and moving the supports to be positioned at a predetermined position and a lateral clamping means provided on each of the pair of supports to push a side face of the fixed mold or movable mold.

A second invention provides a mold clamping apparatus comprising: a fixed platen fixed to a base, a movable platen arranged, being opposed to the fixed platen, to be movable forward and backward, a plurality of tie bars making the fixed platen and movable platen linkable to each other, a mold clamping means causing a tensile force to act on the tie bars to clamp together a mold comprising a fixed mold fitted to the fixed platen and a movable mold fitted to the movable platen and a side pusher comprising a quadrangular frame formed by two vertical members forming a mold right side and left side pair and upper and lower two horizontal members, the vertical members having their respective end portions pin-jointed with respective end portions of the horizontal members, the frame being arranged surrounding the plurality of tie bars with a small gap being maintained between the frame and the plurality of tie bars, a moving and positioning means linking the frame to the fixed platen or movable platen and moving the frame to be positioned at a predetermined position and a lateral clamping means provided on each of the two vertical members to push a side face of the fixed mold or movable mold.

Also, a third invention provides a mold clamping apparatus as mentioned in the first or second invention, wherein at least one pair of the lateral clamping means, being opposed to each other, are provided on respective central portions of the pair of supports.

A fourth invention provides a mold clamping apparatus as mentioned in any one of the first to third inventions, wherein the lateral clamping means is constructed by one of a hydraulic cylinder, electric type screw jack, toggle device and cam mechanism.

A fifth invention provides a mold clamping apparatus as mentioned in any one of the first to third inventions, wherein the lateral clamping means is constructed by a hydraulic cylinder comprising a cylinder rod so that a side face of the mold is pushable by a terminal end portion of the cylinder rod.

A sixth invention provides a mold clamping apparatus as mentioned in any one of the first to fifth inventions, wherein the side pusher is constructed movably between a predetermined lateral clamping position where the side face of the mold is pushed by the lateral clamping means and a stand-by position near the fixed platen or movable platen side where the side pusher is retracted from the lateral clamping position so as not to obstruct a mold exchange work.

A seventh invention provides a mold clamping apparatus as mentioned in the sixth invention, wherein the side pusher has such a width directional size that the side pusher is received more on the fixed platen or movable platen side than a mold fitting face of the fixed platen or movable platen or a mold fitting face of a mold fixing member fitted to the fixed platen or movable platen.

An eighth invention provides a mold clamping apparatus as mentioned in any one of the first to seventh inventions, wherein one or both of the fixed platen and movable platen use a die plate comprising a wall portion, projection projecting from the wall portion, mold fixing portion of a terminal end of the projection and plurality of ribs connecting between the projection and wall portion.

Further, a ninth invention provides an injection molding machine comprising an injection unit and mold clamping apparatus, wherein the mold clamping apparatus is a mold clamping apparatus as mentioned in any one of the first to eighth inventions.

Also, a tenth invention provides an injection molding method using a mold clamping apparatus as mentioned in any one of the first to eighth inventions, comprising the steps of: carrying out a mold clamping by the mold clamping means of the mold clamping apparatus so that the mold comprising the fixed mold and movable mold is clamped together at a mold mating face and pushing both side faces of the fixed mold or movable mold of the mold so clamped by the side pusher so that the fixed mold or movable mold is laterally clamped and, in this state, injecting a molten resin into a mold cavity from an injection unit so that an injection molded article is produced.

According to the first to eighth inventions, the supports are moved to, and positioned at, the predetermined position by the moving and positioning means and the side faces of the fixed mold or movable mold are pushed by the lateral clamping means provided on the supports. Thus, the side faces of the fixed mold or movable mold of the mold closed and clamped at the mold mating face are laterally directly clamped by the side pusher. Hence, the outward flexure deformation of the mold side wall end portion is suppressed and the mouth opening can be prevented. At this time, the pushing position can be appropriately changed and the size of pushing force also can be easily changed. Thereby, realization of a mold with smaller size and lighter weight is facilitated, an optimal mold clamping condition can be selected and yet flash generation on the mold both side portions can be securely suppressed.

Moreover, even in case of an existing mold clamping apparatus, the side pusher of the present invention can be easily added without need to provide a special device on the mold side. Hence, modification of the existing apparatus can be facilitated, inviting no large increase of cost. In case of the side pusher of the second invention, in addition to the above-mentioned effect, such a construction that no force from the lateral clamping means acts on any of the tie bars can be obtained.

According to the third invention, the lateral clamping means is provided on the central portion of each of the supports so that the position where the flexure deformation of the mold side wall becomes largest is pushed. Thereby, the deformation can be efficiently prevented.

According to the fourth invention, as the lateral clamping means, generally obtainable devices, such as a hydraulic cylinder, electric type screw jack, toggle device, cam mechanism or the like, can be used. Hence, without using special parts, the lateral clamping means can be easily and less costly manufactured.

According to the fifth invention, as the lateral clamping means, a hydraulic cylinder is used and the side faces of the mold are pushed by the terminal end portion of the cylinder rod. Thus, the side pusher can be made with a simple and reliable construction.

According to the sixth invention, the side pusher can be moved to the stand-by position from the predetermined lateral clamping position by the moving and positioning means so as not to obstruct the mold exchange work. Hence, even if a large size mold is used, the mold having the fixed mold and movable mold clamped together can be laterally moved without obstruction on the mold exchange.

According to the seventh invention, the side pusher has such a width directional size that the side pusher is received more on the fixed platen or movable platen side than the mold fitting face. Hence, only by moving the side pusher to the vicinity of the fixed platen or movable platen, the side pusher can be easily retracted to the stand-by position so as not to obstruct the mold exchange work.

According to the eighth invention, in addition to the function and effect of the side pusher of any one of the first to seventh inventions, as the fixed platen or movable platen, such a die plate as to comprise the wall portion forming the back face side, projection projecting from the wall portion, mold fixing portion of the terminal end of the projection and plurality of ribs connecting between the projection and wall portion. Hence, the mold clamping force clamping together the fixed platen and movable platen is conveyed to the wall portion from the mold fixing portion via the projection so that the wall portion is deformed swelling toward the mold fixing side. As the result, the ribs receive the compression directional stress. As compared with the prior art case where the tension directional stress acts, in the present invention, a higher allowable stress and higher rigidity can be realized. Thus, a die plate of high rigidity and light weight can be obtained and yet the mouth opening occurring in the mold mating face between the fixed mold and movable mold at the mold clamping time can be efficiently prevented.

Also, according to the ninth invention, by the side pusher carrying out the lateral clamping, the outward flexure of the mold side wall end portion is suppressed and the mouth opening caused by resin pressure at the injection time can be prevented. By so preventing the mouth opening in the mold mating face between the fixed mold and movable mold at the mold clamping time, resin leakage at the injection molding time and flash generation on the molded articles can be securely suppressed.

Furthermore, according to the tenth invention, the fixed mold and movable mold are clamped together at the mold mating face so that the mold clamping is securely carried out, the side faces of the fixed mold or movable mold are pushed by the side pusher so that the lateral clamping is carried out and, in this state, molten resin is injected into the mold cavity from the injection unit so that an injection molded article is produced. Thereby, the mouth opening caused by the mold flexure deformation is prevented and injection molded articles with high quality having no flash generation can be obtained.

BEST MODE FOR CARRYING OUT THE INVENTION

Herebelow, the present invention will be described in detail with reference to appended drawings, based on embodiments as best modes realizing a mold clamping apparatus and injection molding machine as well as practicing an injection molding method all according to the present invention.

First Embodiment of Mold Clamping Apparatus

Figure 1:
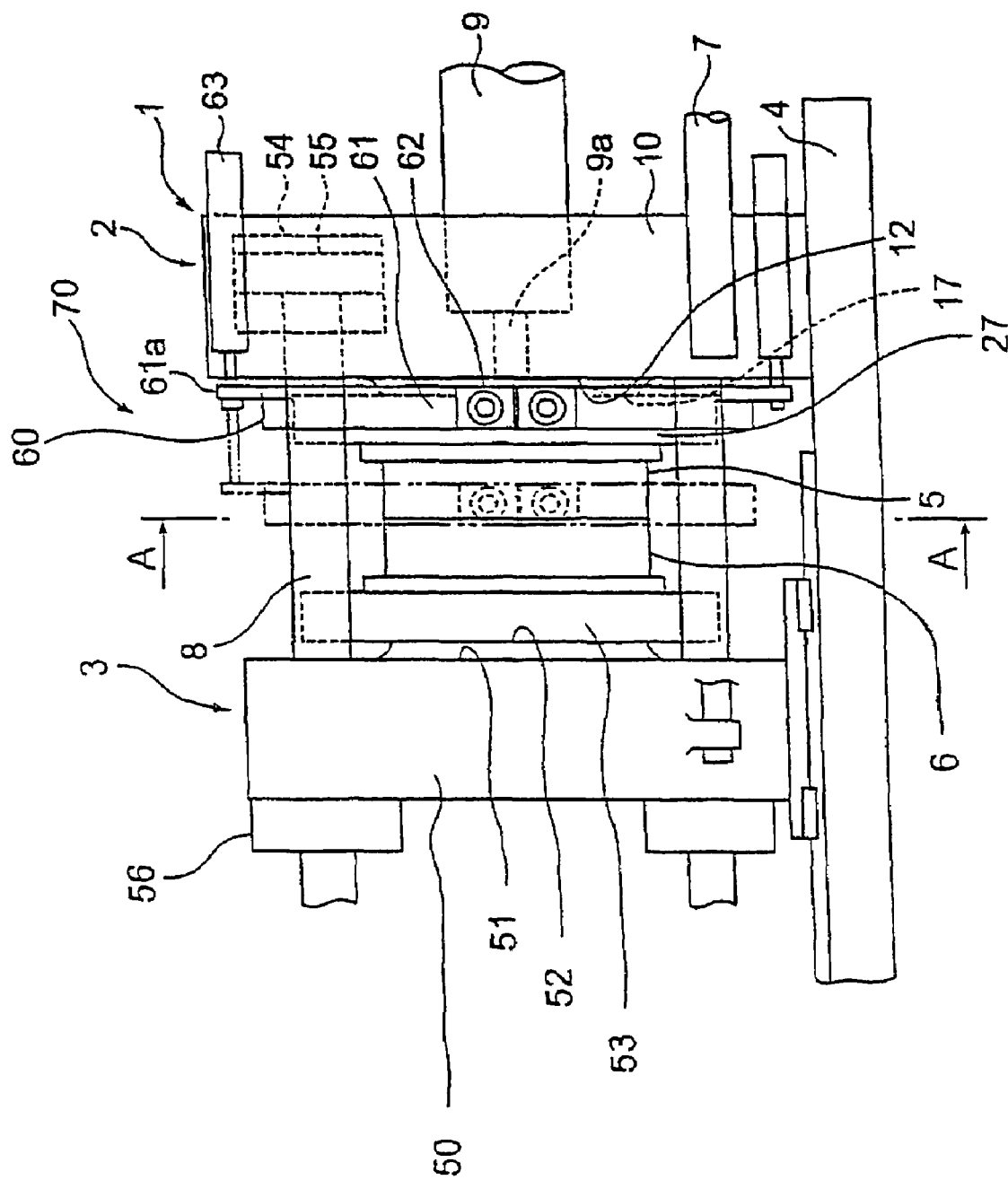
FIG. 1 is a side view showing a construction of related part of an injection molding machine comprising a first embodiment of a mold clamping apparatus according to the present invention.
Figure 2:
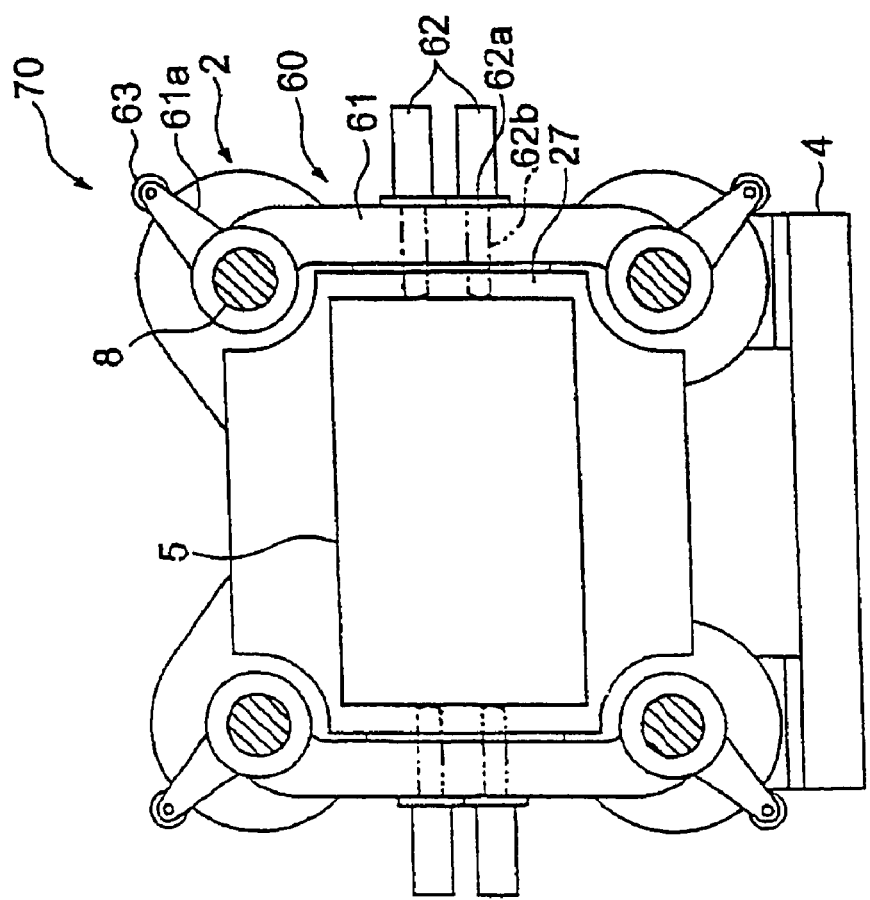
FIG. 2 is a cross sectional view taken on line A-A of FIG. 1.

FIG. 1 is a side view showing a construction of related part of an injection molding machine comprising a first embodiment of a mold clamping apparatus according to the present invention. FIG. 2 is a cross sectional view taken on line A-A of FIG. 1.

In FIGS. 1 and 2, numeral 70 designates a mold clamping apparatus comprising a side pusher 60. A fixed platen 2 as a fixed die plate to which a fixed mold 5 is fitted is fixedly mounted on an injection unit 9 side on a base frame 4 of the injection molding machine. A movable platen 3 as a movable die plate to which a movable mold 6 is fitted is movably arranged along an axial direction of tie bars 8 (right and left directions in FIG. 1) on the base frame 4 by action of a moving cylinder 7, ball screw mechanism or the like. Also, the fixed platen 2 and movable platen 3 are constructed to be linkable to each other by the tie bars 8. A die plate 1 is thus constructed by these parts and components.

The injection unit 9 comprises a nozzle portion 9$a$ so that a molten resin is injected into a mold cavity formed by the fixed mold 5 and movable mold 6.

Figure 8:
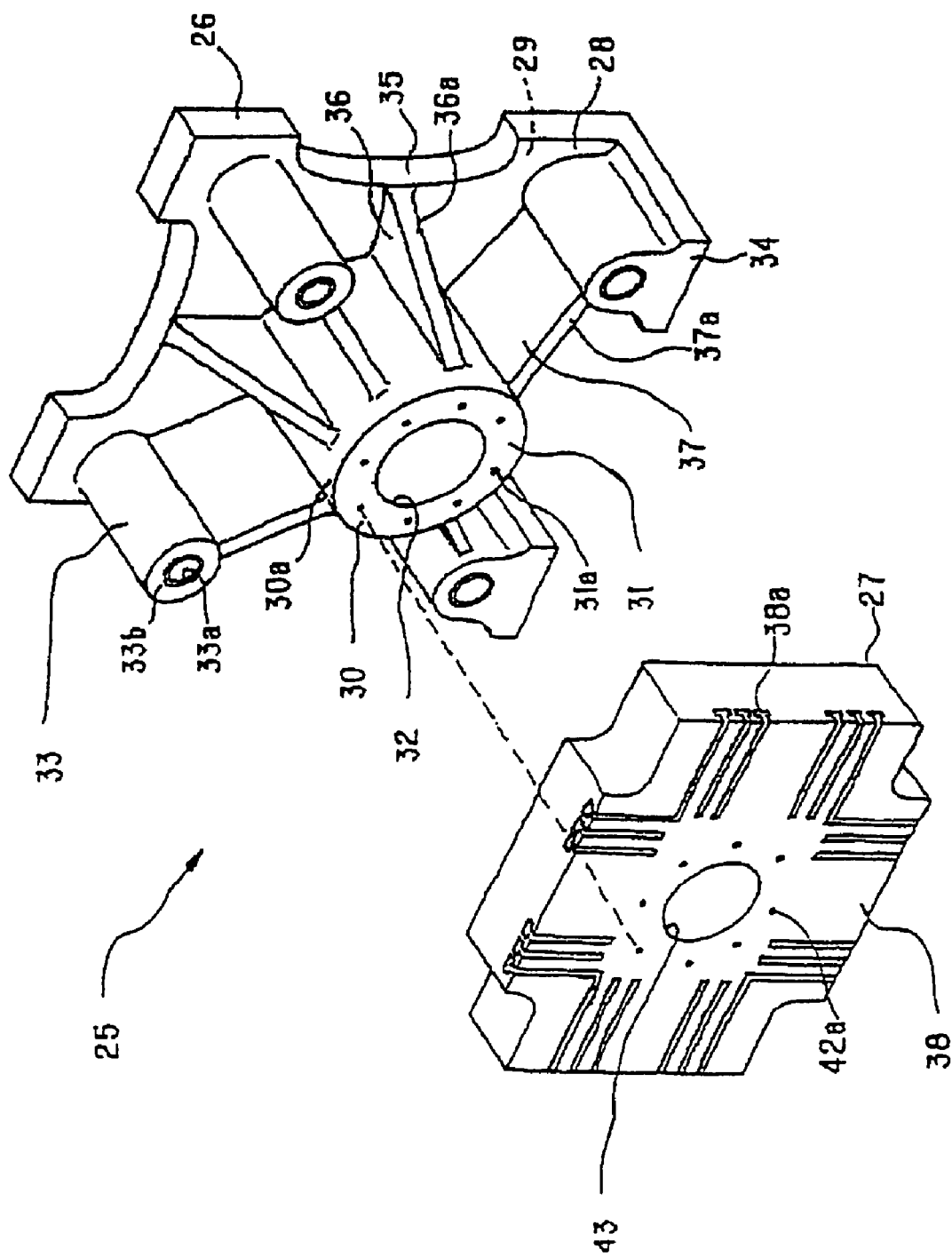
FIG. 8 is a perspective view showing a detailed structure by a broken form of a second embodiment of a die plate used for the mold clamping apparatus according to the present invention.

Numeral 10 designates a platen body constituting the fixed platen 2, numeral 12 a front face of the platen body 10, numeral 17 a fixing end face of the platen body 10 and numeral 27 a mold fixing member fixed to the fixing end face 17. Here, as the mold fixing member 27, a mold fixing member, to be described later, constructed as shown in FIG. 8 is used. The fixed platen 2 is formed by the mold fixing member 27 together with the platen body 10.

The movable platen 3 is provided being opposed to the fixed platen 2 so as to be movable forward and backward by the moving cylinder 7, ball screw mechanism or the like, as mentioned above. Numeral 50 designates a platen body of the movable platen 3, numeral 51 a front face of the platen body 50, numeral 52 a fixing end face of the platen body 50 and numeral 53 a mold fixing member fixed to the fixing end face 52. The movable platen 3 is thus constructed by the mold fixing member 53 together with the platen body 50.

Numeral 8 designates four tie bars that make the fixed platen 2 and movable platen 3 linkable to each other. Each of the tie bars 8 has its one end fitted with a ram 55 of a hydraulic mold clamping cylinder 54. Numeral 56 designates a half nut fitted to the movable platen 3. The half nut 56 is engageable with, and disengageable from, the respective tie bars 8 and, when engaged, can fix the movable platen 3 to the tie bars 8.

It is to be noted that a distance between the front face 12 of the platen body 10 and a front face of the mold fixing member 27 (on the left hand side in FIG. 1) is set larger than a width directional size of the side pusher 60.

The side pusher 60 is constructed by a vertical support 61, lateral clamping cylinder 62 that pushes a side face of the mold and moving and positioning cylinder 63 that moves the vertical support 61 forward and backward relative to the fixed platen 2 to be positioned at a predetermined position (at a position shown by two dotted chain lines in FIG. 1, for example).

The vertical support 61 is a strength member and two pieces thereof are provided in a right and left symmetrical manner relative to each other on both sides of the mold clamping apparatus. Each of the vertical supports 61 forms a beam having its both ends slidably supported to upper and lower two tie bars 8 so as to receive a bending force caused by a central load. As shown in FIG. 2, while a front view of the vertical support 61 is formed roughly with a C-shape outwardly swelling so as to avoid an interference with side portions of the mold fixing member 27, if the mold fixing member 27 is small, the vertical support 61 is preferable to be formed linear.

The lateral clamping cylinder 62 is a hydraulic cylinder comprising a flange-shaped fitting seat 62$a$ and the lateral clamping cylinders of a horizontally arranged pair or a plurality of such pairs, are fixedly provided on respective outer side faces of upper and lower central portions of the two vertical supports 61 of the pair arranged on the right and left sides in FIG. 2, wherein rods 62$b$ of the lateral clamping cylinders 62, as shown by two dotted chain lines in FIG. 2, are provided being opposed to each other. Each of the rods 62$b$ has its one end provided passing through a hole provided in the vertical support 61 so as to abut on a side wall of a female mold (fixed mold) 5 to thereby push a side face of the mold. It is preferable that the end of the rod 62$b$ is formed with a spherical face of a large curvature or it is fitted with a swingable end metal that can swing with a small angle. It is to be noted that in place of the lateral clamping cylinder 62, an electric type screw jack, toggle device or cam device may be used.

The moving and positioning cylinder 63 is a small diameter large stroke type hydraulic cylinder and is fitted, as a pair, to upper and lower portions of the vertical support 61. Each of the moving and positioning cylinders 63 has its cylinder side portion directly fitted to the fixed platen 2 side and its rod side portion fitted to the vertical support 61 side via a bracket 61a. The bracket 61a elongates comparatively long toward an oblique upward direction or oblique downward direction from the vertical support 61 so that the cylinder portion may not interfere with the fixed platen 2.

It is to be noted that the moving and positioning cylinder 63 may have its cylinder side (the opposite side of the rod) fitted to the movable platen 3 side. In this case, a distance between the front face 51 of the movable platen 3 and an outer side face of the mold fixing member 53 (on the right hand side in FIG. 1) is set larger than the width directional size of the side pusher 60.

Next, function of the side pusher 60 constructed as mentioned above will be described.

The two vertical supports 61 on both sides of the side pusher 60 are left stopped being positioned at an appropriate position near the side face of the female mold (fixed mold) 5 by the total four moving and positioning cylinders 63 provided on the upper and lower portions of the vertical supports 61. All the four moving and positioning cylinders 63 are constructed so as to be moved at the always same velocity by a control unit.

After the fixed mold 5 and movable mold 6 are closed together by the moving cylinder 7 and are further clamped by the mold clamping cylinder 54, the lateral clamping cylinders 62 are supplied with a pressurized fluid so that the side faces of the female mold (fixed mold) 5 are pushed together from both sides by an appropriate force. This pushing force by the lateral clamping cylinder 62 suppresses outward flexures of side wall end portions of the female mold (fixed mold) 5 so that the mouth opening there is prevented. Incidentally, as the female mold (fixed mold) 5 is of a structure with a high indeterminacy, the influence of the pushing force added by the lateral clamping cylinder 62 may appear in other places and hence the pushing force and pushing position by the lateral clamping cylinder 62 are to be changed and adjusted corresponding to the case.

By so doing, portions where a large flexure deformation occurs can be pushed and hence the flexure deformation at the terminal end portion of the mold side wall can be efficiently suppressed.

Thus, without need to employ a method to increase a mold thickness so as to enhance the rigidity, the present invention can be applied to various molds and yet a mold clamping apparatus that can securely suppress the flash generation at the mold both side portions can be obtained.

Also, as mentioned above, the fixed mold 5 and movable mold 6 are mated and clamped together at the mold mating face by the mold clamping cylinder 54 and both side faces of the female mold (fixed mold) 5 are pushed by the lateral clamping cylinder 62 of the side pusher 60. In this state, molten resin is injected into the mold cavity from the injection unit 9 so that a molded article is produced.

After the molding, reversely to the above procedures, the lateral clamping cylinder 62 is first loosened and then the mold clamping cylinder 54 is loosened in the same procedures as the prior art case and further the movable mold 6 is moved by the moving cylinder 7. Thereby, the mold is opened and the molded article can be taken out.

On the other hand, when the mold is to be exchanged, in case of a large size mold, the mold having the fixed mold 5 and movable mold 6 clamped together is generally laterally moved by jigs and tools. In this case, if the side pusher 60 is left positioned at the stand-by position (position shown by solid lines in FIG. 1) near the fixed platen 2, the end face of the side pusher 60 on the mold side is on the retracted position more on the fixed platen 2 side than the mold fitting face of the mold fixing member 27. Hence, no obstruction occurs for the mold exchange work and even in case of a large size mold, it can be securely changed without obstruction. It is to be noted that even if the side pusher 60 is provided on the movable platen 3 side, the same effect can be obtained.

Second Embodiment of Mold Clamping Apparatus

Figure 3:
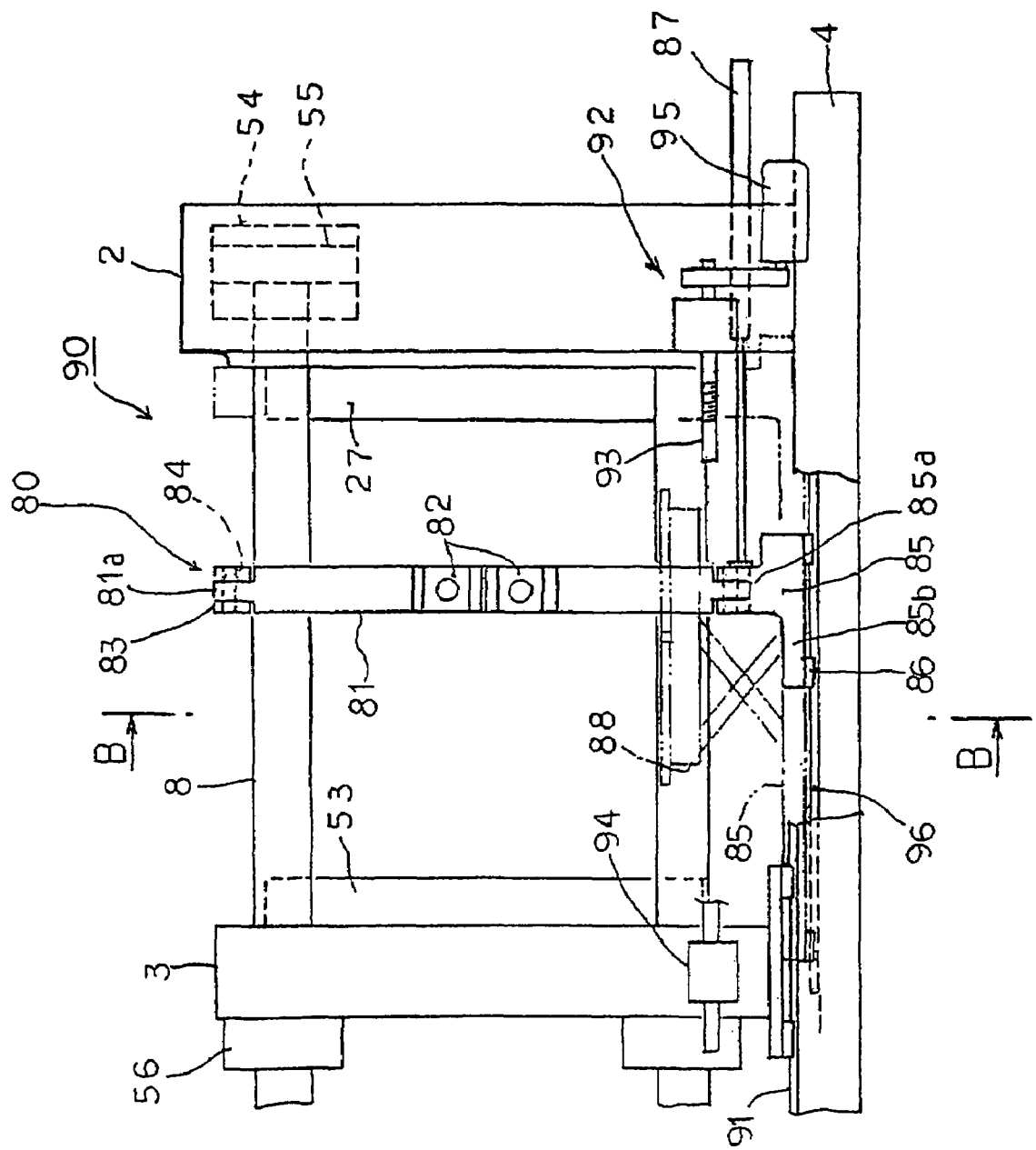
FIG. 3 is a side view showing a construction of related part of an injection molding machine comprising a second embodiment of a mold clamping apparatus according to the present invention.
Figure 4:
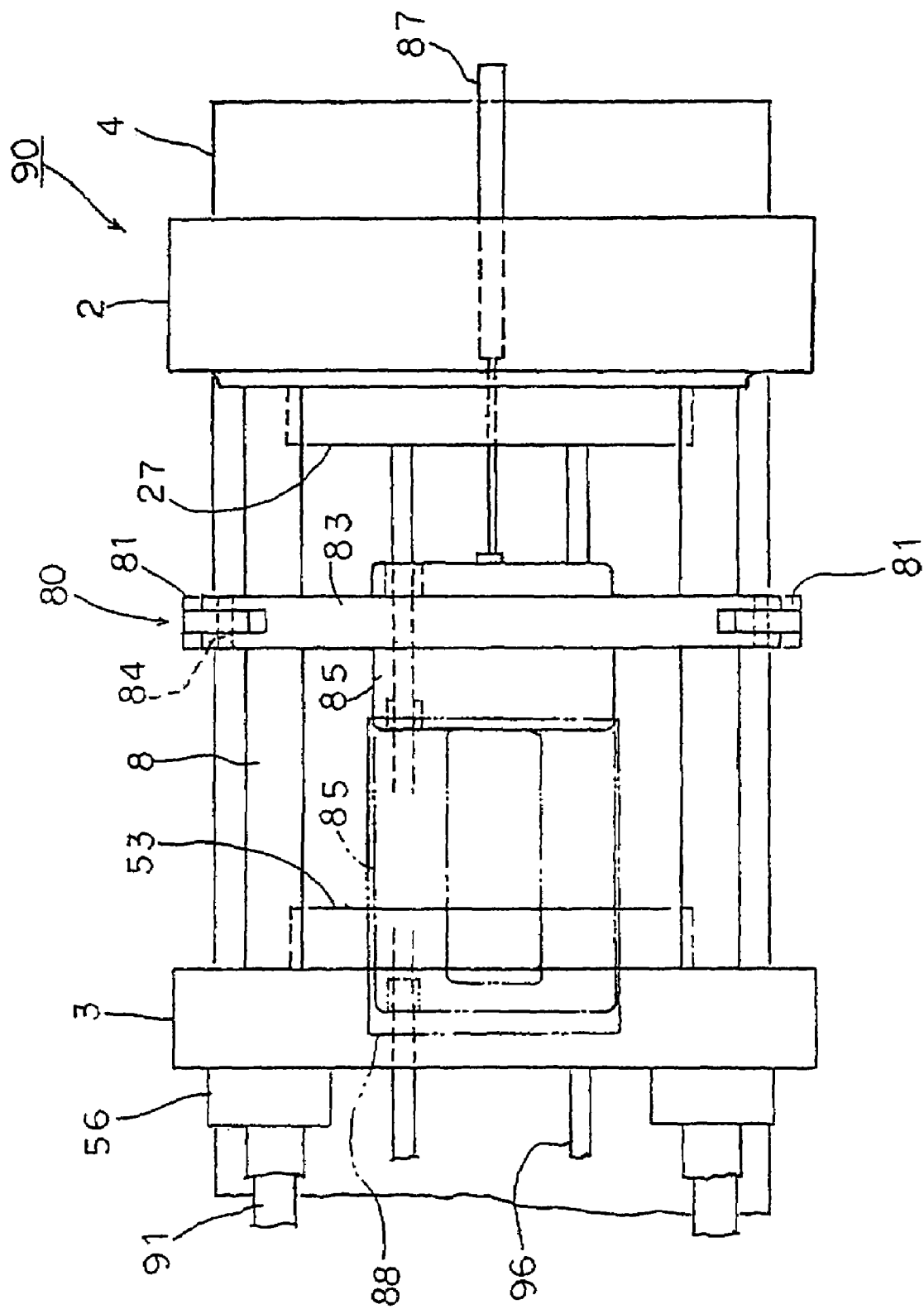
FIG. 4 is a plan view of the injection molding machine part of FIG. 3.
Figure 5:
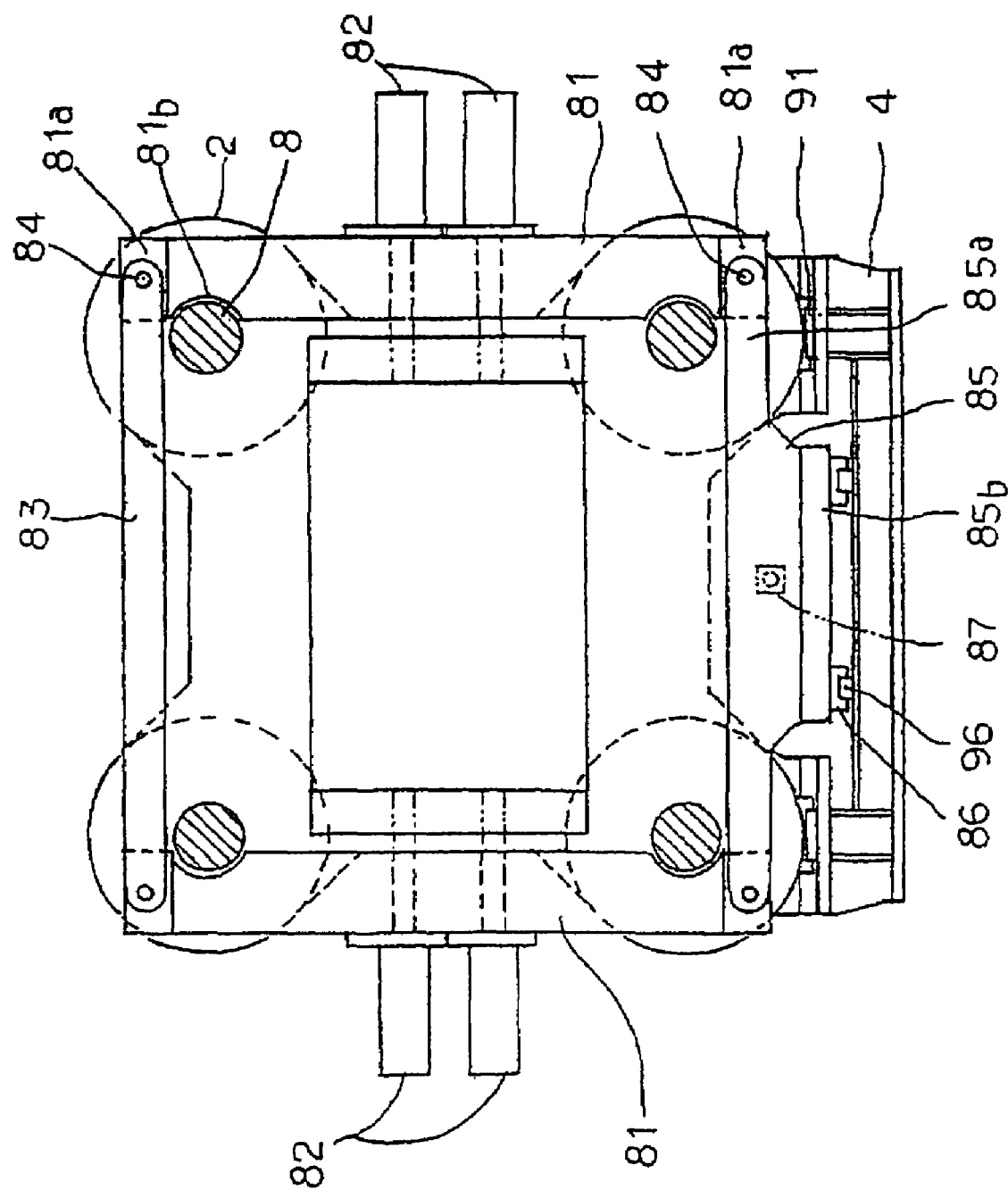
FIG. 5 is a cross sectional view taken on line B-B of FIG. 3.

A second embodiment of a mold clamping apparatus 90 comprising a side pusher 80, different from the side pusher 60, according to the present invention will be described with reference to FIGS. 3 to 5. FIG. 3 is a side view showing a construction of related part of an injection molding machine comprising the second embodiment of the mold clamping apparatus. FIG. 4 is a plan view of the part shown in FIG. 3. FIG. 5 is a cross sectional view taken on line B-B of FIG. 3.

The side pusher 80 is appropriate specifically for use as a large size mold clamping apparatus. As the construction of a body part of the mold clamping apparatus 90 is approximately the same as that of the mold clamping apparatus 70, the same or similar parts and components are given with the same reference numerals and description thereof will be omitted.

In the figures, numeral 2 designates a fixed platen that has its lower end fixed to a base frame 4, numeral 3 a movable platen that is movable forward and backward relative to the fixed platen slidably on a rail 91, numeral 8 a plurality of tie bars, each tie bar having its one end fitted with a ram 55 of a mold clamping cylinder 54 and the other end arranged to slidably pass through the movable platen 2, numeral 56 a half nut that is fitted to the movable platen 3 so as to open and close to thereby engage with, and disengage from, an end portion of each of the tie bars 8 and numeral 92 a moving means that moves the movable platen 3 forward and backward. The moving means 92 comprises a ball screw (shaft) 93 that is rotatably supported to a thrust bearing fixed to the fixed platen 2, a ball nut 94 that is fixed to the movable platen 3 so as to make a thread engagement with the ball screw 93 and a motor 95 that rotationally drives the ball screw 93 via a belt. Numerals 27 and 53 respectively designate mold fixing members provided on two faces, opposed to each other, of the fixed platen 2 and movable platen 3. The fixed mold 5 and movable mold 6 (See FIG. 1) are fitted to the mold fixing members 27 and 53, respectively. It is to be noted that the moving means 92 may also be constructed by the moving cylinder 7 as shown in FIG. 1.

Numeral 80 designates a side pusher. The side pusher 80 is constructed such that two vertical members 81 (that correspond to the vertical supports 61 of the side pusher 60) are arranged vertically standing on the left and right sides in FIG. 5 so as to be opposed to each other and have their upper and lower ends pin-jointed to both ends of upper and lower two horizontal members to thereby form a rectangular frame that surrounds the outer side of four tie bars 8 and this frame is placed on a slide base that is movable in the axial direction of the tie bars 8 (See FIG. 5).

Each of the vertical members 81 has its vertical directional central portion fitted with a pair of, or a plurality of pairs of, horizontal flange type lateral clamping cylinders 82, wherein rods of respective lateral champing cylinders 82 on the left and right sides in FIG. 5 are inwardly directed so as to be opposed to each other. The vertical member 81 has its upper and lower end portions 81a partially cut out so as to form projections (See FIG. 3) and the respective projections are provided with a pin hole. Also, inner side portions, facing the outer side of the tie bars 8, of the vertical member 81 are provided with arc-shaped cutout portions 81b (see FIG. 5). Thereby, the inner side face of the vertical member 81 can be positioned on the inner side of the tie bars 8 with a small gap being maintained between the vertical member 81 and the tie bars 8 so that no interference occurs between them.

Numeral 83 designates an upper horizontal member having a rectangular cross sectional shape. The upper horizontal member 83 has vertical directional central portions of its both end portions cut out so as to form recessed portions and the respective recessed portions are provided with a pin hole. The projection of the upper end 81a of the vertical member 81 is fitted in the recessed portion of both ends of the upper horizontal member 83 and pins 84 are inserted into the pin holes so that pin joints are formed there.

Numeral 85 designates a base member forming a lower member of the rectangular frame. An upper portion of the base member 85 forms a lower horizontal member 85a that has substantially the same structure as the upper horizontal member 83. Thus, the projections of the lower ends 81a of the vertical members 81 are fitted in the recessed portions of both ends of the lower horizontal member 85a and pins 84 are inserted into the pin holes so that pin joints are formed there.

A lower portion of the base member 85 forms a slide plate 85b having a rectangular plane shape. The lower horizontal member 85a connects to the portion vertically rising from the slide plate 85b. The slide plate 85b has its lower face fitted with a plurality of linear guides 86 so that the slide plate 85b can move forward and backward in the axial direction of the tie bars 8 on a rail 96 via the linear guides 86. The slide plate 85b has its lateral width narrowed so that it can come in under the movable platen 3 and fixed platen 2. Numeral 87 designates a moving and positioning cylinder of a small diameter large stroke type. The moving and positioning cylinder 87 has its rod side connected to the base member 85 and its cylinder side swingably connected to the base frame 4 side. In order to prevent occurrence of a plane strain of the rectangular frame, if necessary, additional moving and positioning cylinders 87, all movable at the same velocity, may be provided so as to connect between upper outer sides of the vertical member 81 and fixed platen 2, respectively.

In case of a large size mold clamping apparatus, the slide plate 85b may be elongated as shown by two dotted chain lines in FIG. 4 so that a work station 88 that is movable up and down by a folding type lifter is provided on this elongated portion. Thereby, a mold maintenance work can be carried out. FIG. 3 shows a state where the side pusher 80 is moved to the fixed platen 2 side and the work station 88 is lifted up.

Function of the side pusher 80 constructed as mentioned above will be described.

The functions to move the side pusher 80 to stay at an appropriate position by the moving and positioning cylinder 87, to clamp the mold by both of the mold clamping cylinder 54 and lateral clamping cylinder 82 of the side pusher 80 and to inject a resin from the injection unit 9 are the same as in the case of using the side pusher 60 and description thereof will be omitted.

The rectangular frame of the side pusher formed by the two vertical members 81, upper horizontal member 83 and lower horizontal member 85a has its four corner portions formed by the pin joint form so that the shape of the frame can be easily deformed into a lozenge (parallelogram). While the vertical member 81 can incline leftward and rightward relative to the vertical direction, such an inclination is limited within the gap size between the arc shaped cutout 81b of the end portions of the vertical member 81 and the tie bars 8. Also, the reactions of the pushing forces added by the left and right lateral clamping cylinders 82 are canceled with each other via the upper and lower horizontal members 83, 85a, so that no force acts on the tie bars 8 from the lateral clamping cylinders 82.

Next, construction of the die plate used for the mold clamping apparatus 70 and 90 of the above-mentioned embodiments will be described based on first to third embodiments of the die plate with reference to appended drawings. It is to be noted that while description of the above-mentioned side pushers 60 and 80 is omitted in the description of the embodiments of the die plate, the mold clamping apparatus 70 or 90 used for the first to third embodiments of the die plate comprises the same side pusher 60 or 80 as mentioned above.

Figure 6:
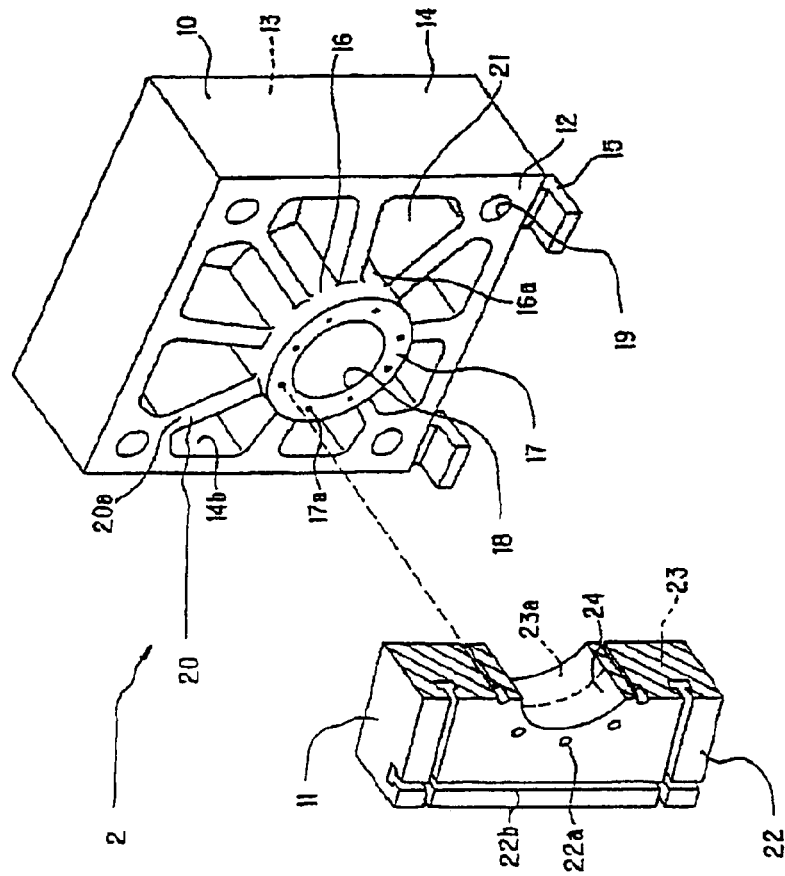
FIG. 6 is a perspective view showing a detailed structure by a broken form of a first embodiment of a die plate used for the mold clamping apparatus according to the present invention.

FIG. 6 is a perspective view showing a detailed structure by a broken form of the first embodiment of the die plate. Here, the fixed platen 2 as a fixed die plate to which the fixed mold 5 is to be fitted is shown.

The fixed platen 2 is constructed by the platen body 10 of a rectangular parallelopiped shape that supports end portions of the tie bars 8 and the mold fixing member 11 of a rectangular parallelopiped shape to which the fixed mold 5 is to be fitted.

The platen body 10 comprises the front face 12 positioned on the mold fixing member 11 side, a wall portion forming a back face 13 positioned on the injection unit 9 side and a body side wall (frame portion) 14 as a side wall of the platen body 10. A fitting portion 15 by which the platen body 10 is to be fitted to the base frame 4 is provided on a bottom surface of the platen body 10 positioned below the body side wall 14.

In a central portion of the platen body 10, a projection 16 of cylindrical shape is formed projecting toward the front face 12 side from the back face 13. A terminal end face of the projection 16 is formed as a fixing end face 17 to which the mold fixing member 11 is to be fixed and a plurality of bolt holes 17a are bored therein. It is to be noted that the fixed mold 5 can also be directly fixed to the fixing end face 17 without the mold fixing member 11 being interposed. A large hole passing through the central portion of the projection 16 is a receiving hole 18 through which the nozzle portion 9a of the injection unit 9 (see FIG. 1) is arranged. The fixing end face 17 projects more toward the mold fixing member 11 side than the front face 12 of the body side wall 14.

In four corner portions of the platen body 10, tie bar holes 19 are bored as tie bar fitting portions integrally formed with the body side walls 14 for supporting the end portions of the tie bars 8. The end portions of the tie bars 8 pass through the tie bar holes 19 and are connected to the mold clamping cylinder (not shown) on the back face 13 side. By action of this mold clamping cylinder, the movable platen 3 is clamped to the fixed platen 2 side to thereby generate a mold clamping force. It is to be noted that the mold clamping cylinder may be provided in the fixed platen body 10, as shown in FIG. 1.

A plurality of body radial ribs 20 are formed extending toward the front face 12 side from the wall portion forming the back face 13 and connecting between and among an outer circumferential face 16a of the projection 16, the wall portion forming the back face 13 and an inner face 14b of the body side wall 14. The body radial ribs 20 have rib top faces 20a extending toward the front face 12 of the body side wall 14 from the vicinity of the fixing end face 17. The rib top faces 20a preferably connect to the projection 16 side, or more preferably to the fixing end face 17. The number of the body radial ribs 20 can be freely set according to the strength required of the platen body 10. Also, spaces surrounded by the outer circumferential face of the projection 16, inner face 14b of the body side wall 14 and body radial ribs 20 are formed as empty portions 21.

On the other hand, the mold fixing member 11 comprises a mold fitting face 22 of a rectangular shape to which the fixed mold 5 is to be fitted and, on the back side thereof, a body fitting face 23 of a rectangular shape to be fitted to the fixing end face 17 of the platen body 10. In a central portion of the mold fixing member 11, a receiving hole 24 is bored passing through the mold fitting face 22 and body fitting face 23, so that the nozzle portion 9a of the injection unit 9 is arranged passing through the receiving hole 24.

Around the receiving hole 24 opening in the mold fitting face 22, bolt holes 22a for fitting the mold fixing member 11 to the platen body 10 are bored so as to pass through a connecting face 23a formed in the body fitting face 23 to be connected to the fixing end face 17. That is, the bolt holes 17a of the fixing end face 17 and the bolt holes 22a are provided being opposed to each other and by bolting together the bolt holes 22a and 17a, the mold fixing member 11 is fitted to the platen body 10.

In and along outer peripheral portions of the mold fitting face 22, T-shape cross sectional grooves 22b are formed and by fixing tools inserted and held in the T-shape grooves 22b, the fixed mold 5 is fitted and clamped.

It is to be noted that as the die plate structure on the movable platen 3 side is substantially the same as the die plate structure on the fixed platen 2 side, description thereof will be omitted. But on the movable platen 3 side, as there is arranged no injection unit 9, there is no need to provide the receiving holes 18, 24 in the movable platen body 50 and mold fixing member 53.

Next, function of the mold clamping apparatus using the above-mentioned die plate will be described.

First, by operating the moving cylinder 7, the movable platen 3 is moved until the movable mold 6 abuts on the fixed mold 5 and the movable platen 3 and tie bars 8 are linked and fixed to each other by the half nut. Then, by action of the hydraulic mold clamping cylinder, a mold clamping force is generated between the movable platen 3 and fixed platen 2 so that the mold is clamped together.

By the fixed platen 2 and movable platen 3 given with the mold clamping force, the mold clamping force is conveyed to the mold fixing member 11 from the fixing end face 17 via the connecting face 23a and is further conveyed to the fixed mold 5 and movable mold 6 from the mold fixing member 11.

Figure 7:
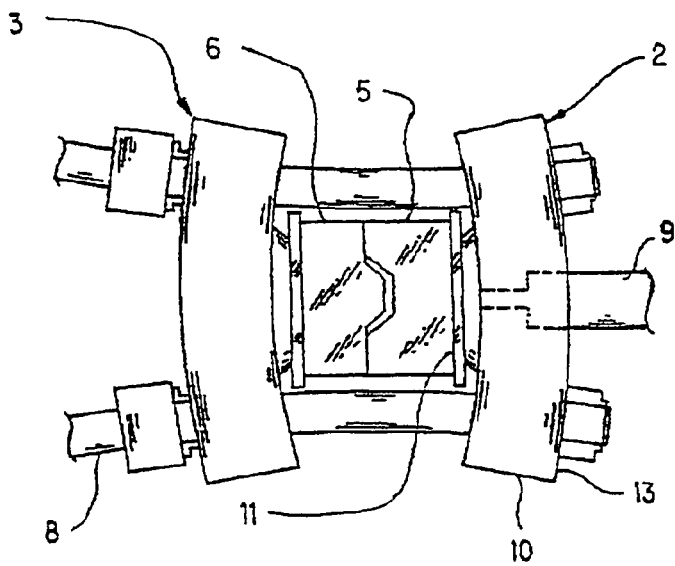
FIG. 7 is a side view explaining a functioning state of the mold clamping apparatus using the die plate of FIG. 6.

At this time, even if the fixed platen 2 and movable platen 3 are deformed as shown in FIG. 7, the fixing end faces 17 formed in the central portions of the fixed platen 2 and movable platen 3 connect only to the connecting faces 23a formed in the central portions of the body fitting faces 23. Thus, without being influenced by the deformation quantity of the fixed platen 2 and movable platen 3, the mold clamping force is securely conveyed to the mold fixing members 11 from the fixed platen 2 and movable platen 3 and further to the fixed mold 5 and movable mold 6 from the mold fixing members 11. Hence, the mouth opening occurring at the mold mating face between the fixed mold 5 and movable mold 6 can be controlled.

Also, as the fixed platen 2 and movable platen 3 are formed therein with the body radial ribs 20, rigidity of the platen body 10 is enhanced and deformation of the fixed platen 2 and movable platen 3 can be reduced. That is, by forming the body radial ribs 20, the platen body 10 of a high rigidity can be obtained. Also, as the top faces 20a of the body radial ribs 20 connecting to the outer circumferential face 16a of the projection 16 connect to the vicinity of the fixing end face 17, deformation of the projection 16 is also suppressed and the fixing end face 17 of the projection 16 can be securely connected to the connecting face 23.

Also, as the platen body 10 is made to have the high rigidity by the body radial ribs 20 and is formed with the empty portions 21, weight of the platen body 10 can be reduced. Thereby, weight alleviation of the die plate 1 can be realized.

In this way, by providing the projection 16 of the platen body 10 projecting higher than the end face (front face) 12 of the body side wall 14 and comprising the fixing end face 17 connected with the connecting face 23a of the mold fixing member 11 and the body radial ribs 20 connecting between the outer circumferential face 16a and body side wall 14, the mold clamping force is securely conveyed to the fixed mold 5 and movable mold 6 from the fixing end face 17 via the mold fixing member 11 and the fixed mold 5 and movable mold 6 can be securely clamped together.

Thereby, the mouth opening occurring at the mold mating face between the fixed mold 5 and movable mold 6 is controlled and generation of flashes on the molded articles can be suppressed. Also, rigidity of the platen body 10 is enhanced by the body radial ribs 20 and weight alleviation is realized by forming the empty portions 21. Hence, a higher rigidity and lighter weight of the platen body 10 can be achieved.

Figure 9:
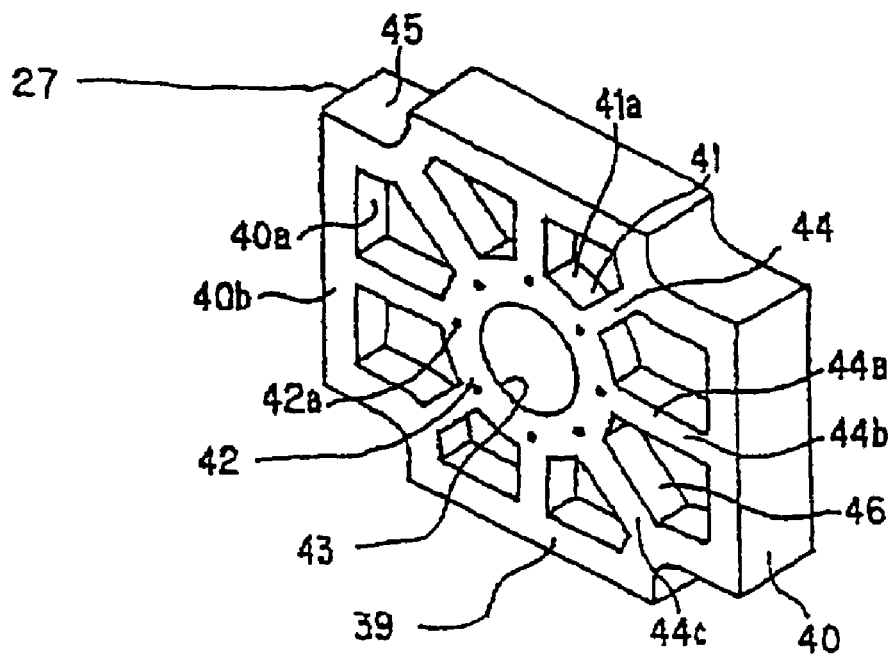
FIG. 9 is a perspective view showing a structure of a mold fixing member of the die plate of FIG. 8, wherein FIG. 9($a$) shows a body fitting face side thereof and FIG. 9($b$) shows a mold fitting face side thereof.
Figure 9:
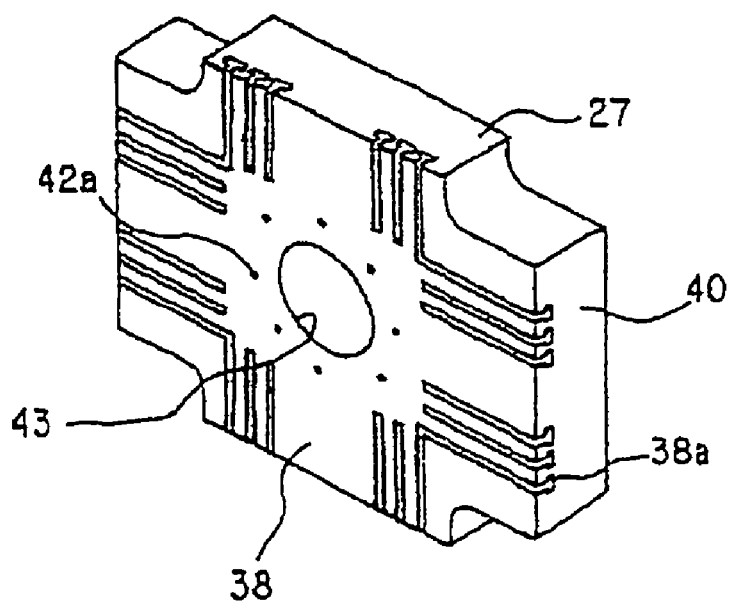

FIG. 8 is a perspective view showing a detailed structure by a broken form of a second embodiment of the die plate. FIG. 9 is a perspective view showing a structure of a mold fixing member of the die plate of FIG. 8, wherein FIG. 9(a) shows a body fitting face side thereof and FIG. 9(b) shows a mold fitting face side thereof.

As shown in FIG. 8, a fixed platen 25 is constructed by a platen body 26 and mold fixing member 27. The platen body 26 comprises a wall portion that has a front face 28 positioned on the mold fixing member 27 side and a back face 29 positioned on the injection unit 9 side.

In a central portion of the platen body 26, a projection 30 of cylindrical shape is formed projecting toward the front face 28 side from the back face 29. A terminal end face of the projection 30 is formed as a fixing end face 31 to which the mold fixing member 27 is to be fixed and a plurality of bolt holes 31a are bored therein. It is to be noted that as in the case of the first embodiment of the die plate, the fixed mold 5 can also be directly fixed to the fixing end face 31 without the mold fixing member 27 being interposed. A large hole passing through the central portion of the projection 30 is a receiving hole 32 through which the nozzle portion 9a of the injection unit 9 is arranged.

In four corner portions of the platen body 10, tie bar fitting portions 33 of cylindrical shape are formed projecting toward the front face 28 side from the back face 29 for supporting the end portions of the tie bars 8. In central portions of the tie bar fitting portions 33, tie bar passing holes 33a are bored. Here, the fixing end face 31 projects more toward the mold fixing member 27 side than end faces 33b of the tie bar fitting portions 33. The end portions of the tie bars 8 pass through the tie bar passing holes 33a and are connected to a hydraulic mold clamping cylinder (not shown) on the back face 29 side. By action of this mold clamping cylinder, the movable platen (not shown) is clamped to the fixed platen 25 side to thereby generate a mold clamping force. On the lower two tie bar fitting portions 33, fitting portions 34 by which the platen body 26 is to be fitted to the base frame 4 is integrally formed. Also, in each side of the wall portion forming the front face 28 and back face 29, a cut-away portion 35 of an arc shape swelling toward the projection 30 side is formed.

A plurality of ribs 36 (four ribs in FIG. 8) are formed, each thereof connecting between the wall portion forming the front face 28 and back face 29 and the projection 30 and having a rib top face 36a extending to a central portion of the cut-away portion 35 from the vicinity of the fixing end face 31. Also, a plurality of ribs 37 (four ribs in FIG. 8) are formed, each thereof connecting between the wall portion forming the front face 28 and back face 29 and the projection 30 and having a rib top face 37a extending to the vicinity of the end face 33b of the tie bar fitting portion 33 from the vicinity of the fixing end face 31.

It is to be noted that the connection position where the rib top faces 36a, 37a connect to an outer circumferential face 30a of the projection 30 is preferable to be more on the mold fixing member 27 side than the end face 33b of the tie bar fitting portion 33 and most preferable to be on the fixing end face 31. Also, the connection position where the rib top face 37a connects to the tie bar fitting portion 33 is most preferable to be on the end face 33b of the tie bar fitting portion 33.

That is, the ribs 36, 37 are radially formed around the center of the projection 30 and have their height gradually reduced toward the outer side. It is to be noted that the number of the ribs 36, 37 can be freely set corresponding to the strength required of the platen body 26.

On the other hand, as shown in FIG. 9, the mold fixing member 27 formed with an approximate rectangular shape comprises a mold fitting face 38 to which the fixed mold 5 is to be fitted, body fitting face 39 to be fitted to the platen body 26 side and member side wall 40 as a side wall of the mold fixing member 27. In four corner portions of the mold fixing member 27, cut-away portions 45 of arc shape are formed swelling toward the central portion of the mold fixing member 27 so that the mold fixing member 27 may not interfere with the tie bars 8. It is to be noted that if vertical and lateral sizes of the mold fixing member 27 can be made smaller so that no interference with the tie bars occurs, there is no need to form the cut-away portion 45. Also, the shape of the mold fixing member 27 is not limited to the rectangular shape but may be other forms, such as a polygonal shape.

In a central portion of the mold fixing member 27, a connection portion 41 of cylindrical shape is formed projecting toward the body fitting face 39 side from the mold fitting face 38. An end face of the connection portion 41 is formed as a connection face 42 to be fixed to the platen body 26 and a plurality of bolt holes 42a are bored therein. The bolt holes 42a pass through to the body fitting face 39 from the mold fitting face 38. Also, a large hole passing through the central portion of the connection portion 41 is a receiving hole 43 through which the nozzle portion 9a of the injection unit 9 is arranged.

That is, by fitting the connection face 42 to the fixing end face 31 of the projection 30, the mold fixing member 27 is fixed to the platen body 26. That is, the bolt holes 42a are provided being opposed to the bolt holes 31a of the fixing end face 31 and by bolting together the bolt holes 42a and 31a, the mold fixing member 27 can be fixed to the platen body 26.

A plurality of member radial ribs 44 are radially formed, each thereof extending to the body fitting face 39 side from the mold fitting face 38, connecting between an outer circumferential face 41a of the connection portion 41 and an inner face 40a of the member side wall 40 and having a rib top face 44a extending to an end face 40b of the member side wall 40 from the connection face 42. The position where the rib top face 44a of the member radial rib 44 connects to the outer circumferential face 41a of the connection portion 41 is preferable to be more on the platen body 26 side than the end face 40b of the member side wall 40 and most preferable to be on the connection face 42.

The member radial ribs 44 are constructed by ribs 44b [four ribs in FIG. 9(a)] connecting between the outer circumferential face 41a of the connection portion 41 and central portions of the end faces 40b of the member side walls 40 and ribs 44c [four ribs in FIG. 9(a)] connecting between the outer circumferential face 41a of the connection portion 41 and the cut-away portions 45. The number of the ribs 44b, 44c can be freely set corresponding to the strength required of the mold fixing member 27. Also, spaces surrounded by the outer circumferential face 41a of the connection portion 41, inner faces 40a of the member side walls 40 and ribs 44b and 44c are empty portions 46.

In the mold fitting face 38, a plurality of T-shape cross sectional grooves 38a are formed. By fixing tools inserted and held in the T-shape grooves 38a, the fixed mold 5 is clamped to be fitted to the mold fixing member 27.

Figure 10:
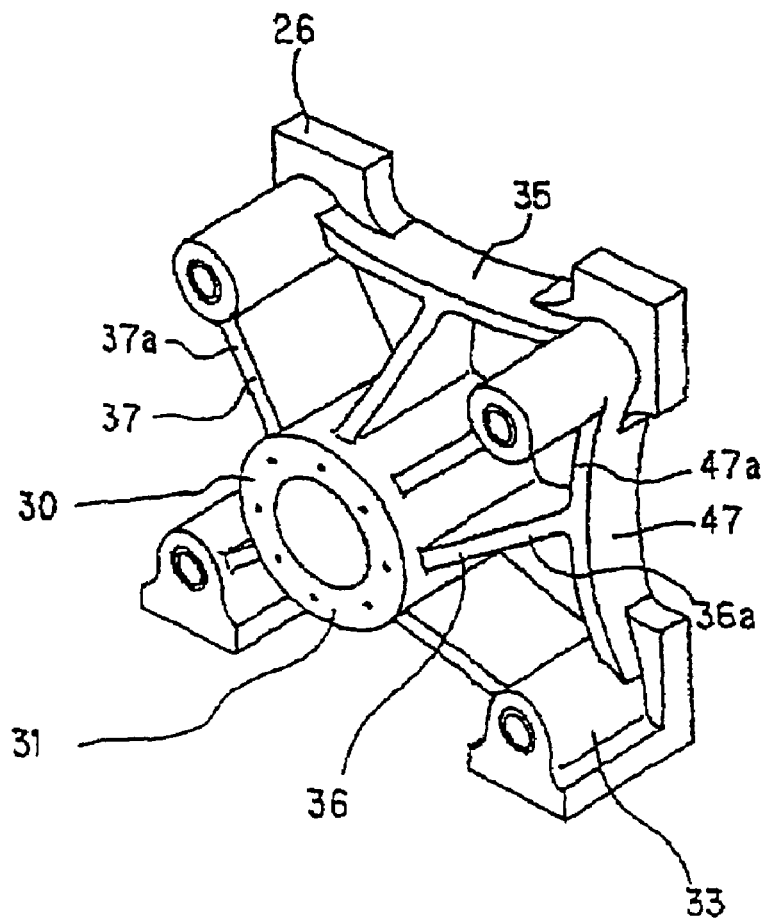
FIG. 10 is a perspective view showing a platen body structure of a third embodiment of a die plate used for the mold clamping apparatus according to the present invention.

Also, as shown by a third embodiment of FIG. 10 as a variation of the second embodiment of the die plate of FIG. 8, a rib 47 can be formed extending to the fixing end face 31 side from the front face 28, connecting between each of the tie bar fitting portions 33 and having a rib top face 47a connecting to the rib top face 36a of the rib 36.

With respect to the second and third embodiments of the die plate, the die plate structure of the movable platen 3 is substantially the same as the die plate structure of the fixed platen 25 and hence repeated description thereof will be omitted. It is to be noted that on the movable platen 3 side, as there is provided no injection unit 9, the receiving holes 32, 43 may not necessarily be formed in the movable platen body 50 and mold fixing member 53.

According to the die plates of the second and third embodiments as mentioned above, even if the fixed platen 25 and movable platen are deformed, the fixing end faces 31 formed at the central portions of the fixed platen 25 and movable platen are connected only to the connection face 42 formed at the central portion of the body fitting face 39. Thus, without being influenced by the deformation quantity of the fixed platen 25 and movable platen, the mold clamping force can be securely conveyed to the mold fixing member 27 from the fixed platen 25 and movable platen and further to the fixed mold 5 and movable mold 6 from the mold fixing member 27. Thereby, the mouth opening occurring at the mold mating face between the fixed mold 5 and movable mold 6 can be controlled.

Also, as the ribs 36, 37 are provided on each of the platens, rigidity of the platen body 26 is enhanced and deformation of the fixed platen 25 and movable platen at the injection molding time can be reduced. That is, by forming the ribs 36, 37, a high rigidity of the fixed platen 25 and movable platen can be obtained.

Moreover, by forming the ribs 47 connecting between and among the tie bar fitting portions 33 and the front face 28, rigidity of the fixed platen 25 and movable platen can be further enhanced.

Also, in the ribs 36, 37 connected to the outer circumferential face 30a of the projection 30, as the rib top faces 36a, 37a thereof connect to the vicinity of the fixing end face 31, deformation of the projection 30 can also be suppressed. Also, in the second and third embodiments, as compared with the first embodiment, as no body side wall 14 is provided, weight of the fixed platen 25 and movable platen can be further reduced.

In the mold fixing member 27, as the connection face 42 is formed at the central portion thereof, the mold clamping force from the fixing end face 31 can be securely conveyed. Also, as the outer circumferential face 41a of the connection face 41 and the inner face 40a of the member side wall 40 are connected together by the ribs 44b, 44c, a high rigidity of the mold fixing member 27 can be obtained. Further, as the cut-away portions 45 and empty portions 46 are formed, weight of these portions can be reduced.

Thus, according to the second and third embodiments, there are provided the projection 30 of the platen body 26 having the fixing end face 31, to which the connection face 42 of the mold fixing member 27 is to be connected, positioned higher than the end faces 33b of the tie bar fitting portions 33, the ribs 36 connecting between the outer circumferential face 30a of the projection 30 and cut-away portions 35 and the ribs 37 connecting between the outer circumferential face 30a of the projection 30 and tie bar fitting portions 33. Thereby, the mold clamping force from the fixing end face 31 can be securely conveyed to the fixed mold 5 and movable mold 6 via the mold fixing member 27 and the fixed mold 5 and movable mold 6 can be securely clamped together.

Accordingly, the mouth opening occurring at the mold mating face between the fixed mold and movable mold is controlled and flash generation on the molded articles can be suppressed. Also, the ribs 36, 37 enhance the rigidity of the platen body 26 and elimination of the body side wall 14 and formation of the cut-away portion 35 are enabled. Thus, weight of the platen body is alleviated and a fixed platen of a higher rigidity and lighter weight can be obtained.

Also, the ribs 47 are provided to connect between each of the tie bar fitting portions 33 and between the tie bar fitting portions 33 and front face 28. Thereby, the rigidity of the platen body 26 can be further enhanced.

Further, by forming the connection portion 41 comprising the connection face 42 to be connected to the fixing end face 31 and the member radial ribs 44 connecting between the outer circumferential face 41a of the connection portion 41 and member side walls 40, the mold clamping force from the platen body 26 can be securely conveyed to the mold fixing member 27. Hence, the fixed mold 5 and movable mold 6 can be securely clamped together, the mouth opening occurring at the mold mating face between the fixed mold 5 and movable mold 6 can be controlled and flash generation on the molded articles can be suppressed. Also, the member radial ribs 44 enhance the rigidity of the mold fixing member 27 and the cut-away portions 45 and empty portions 46 are formed. Thus, weight alleviation of the mold fixing member 27 is achieved and a higher rigidity and lighter weight of the mold fixing member 27 can be realized.

Figure 11:
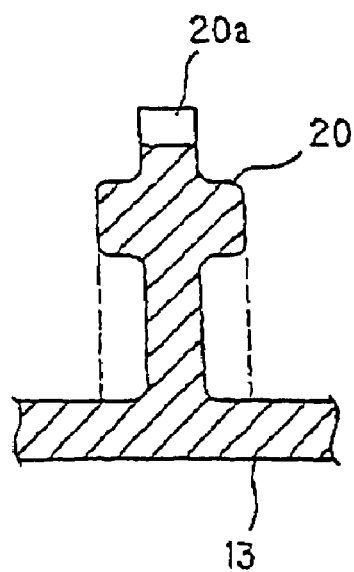
FIG. 11 is a cross sectional view showing an embodiment of a rib portion of the die plate used for the mold clamping apparatus according to the present invention.
Figure 12:
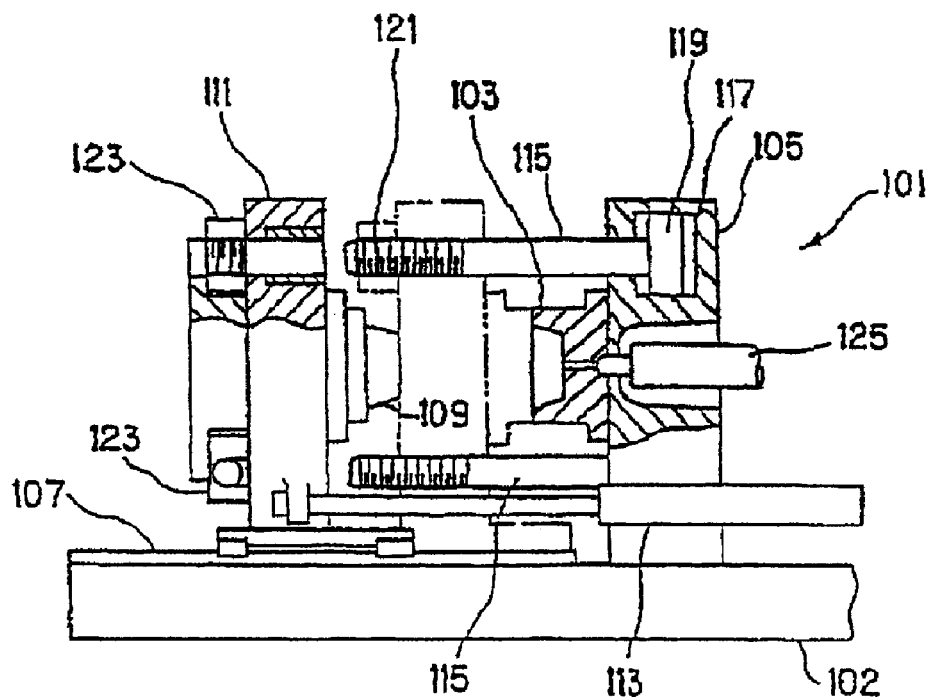
FIG. 12 is a schematic view showing a mold clamping apparatus of injection molding machine in the prior art.
Figure 13:
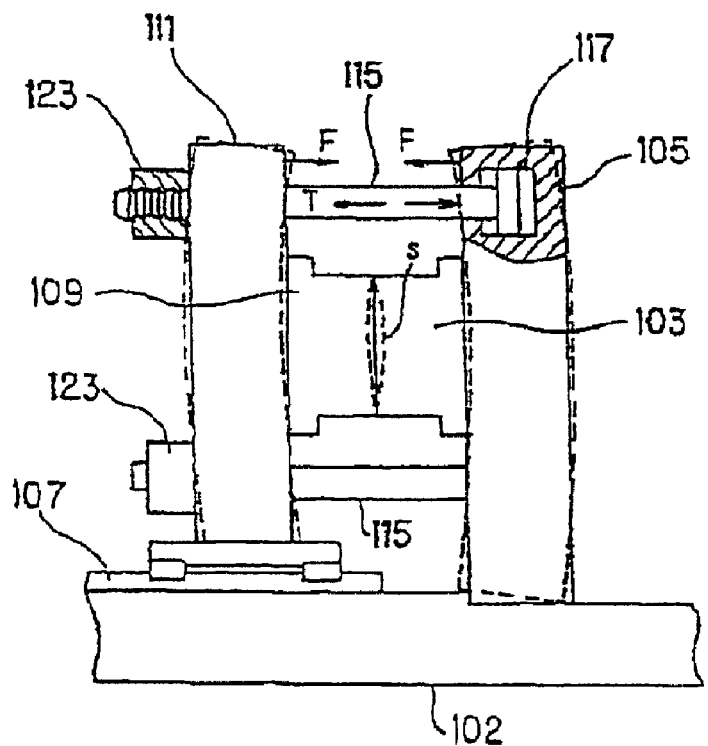
FIG. 13 is a schematic view explaining a function of the mold clamping apparatus of injection molding machine in the prior art.
Figure 14:
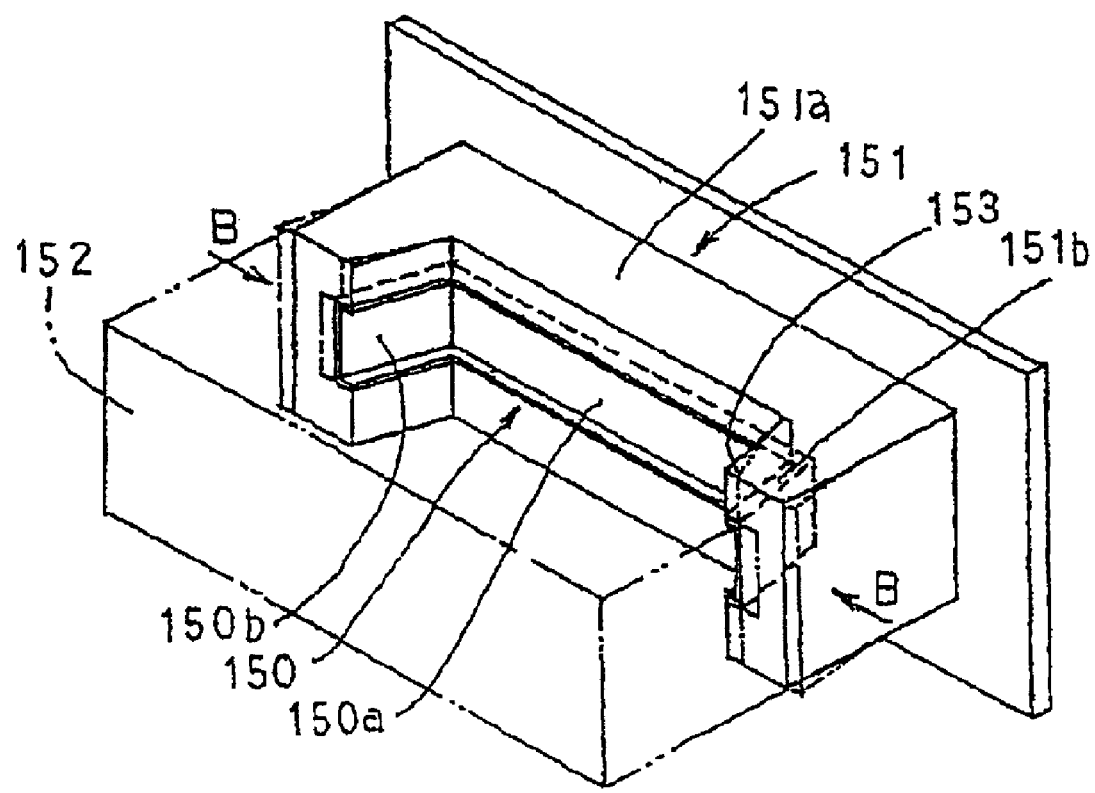
FIG. 14 is a schematic view showing a function of mold in the prior art.

If the body radial ribs 20 formed on the die plate of the first embodiment shown in FIG. 6 are made with such an I-shape cross section as shown in FIG. 11, a further weight alleviation can be realized. Also, if the ribs 36, 37, member radial ribs 44, and ribs 47 connecting between and among the tie bar fitting portions 33 and front face 28 are made with such I-shape cross section, the same weight alleviation can be realized.

Also, while the die plate structure of the present embodiments is applied to both of the fixed platen and movable platen, it may be applied to one of them only. Further, a combination of the die plate structure of the first embodiment and that of the second embodiment may be used.

As mentioned above, in addition to the function and effect of the side pusher 60, 80, the mold clamping apparatus 70, 90 including the die plates of the first to third embodiments specifically uses such a die plate, as the fixed platen or movable platen, as comprises the wall portion (wall portion forming the back face 13, 29 side of the platen body), projection 16, 30 projecting from the wall portion, mold fixing member 11, 27 fitted to the terminal end of the projection and the plurality of ribs 20, 36, 37 connecting between the projection and wall portion. Hence, the mold clamping force clamping together the fixed platen and movable platen is conveyed to the wall portion from the mold fixing member via the projection so that the wall portion is deformed swelling toward the mold fixing member side. As the result, the ribs receive a compression directional stress. As compared with the prior art case where a tension directional stress acts, in the present invention, a higher allowable stress and higher rigidity can be obtained. Thus, a die plate of higher rigidity and lighter weight can be realized and yet the mouth opening occurring at the mold mating face between the fixed mold and movable mold at the mold clamping time can be efficiently prevented.

INDUSTRIAL APPLICABILITY

The present invention can be applied to a mold clamping apparatus of a mold having a side wall portion of cantilever type and can efficiently suppress a deformation of the mold side wall portion, thereby effectively contributing to making the mold lighter. Also, this mold clamping apparatus can be effectively applied to an injection molding machine and injection molding method and resin molded articles with high quality having no flash generation can be produced by injection molding. Moreover, a die plate of a high rigidity and light weight to be used for the mold clamping apparatus can be efficiently realized.

What claimed is:
1. A mold clamping apparatus comprising:
a fixed platen fixed to a base,
a movable platen arranged, being opposed to said fixed platen, to be movable forward and backward,
a plurality of tie bars making said fixed platen and movable platen linkable to each other,
a mold clamping means causing a tensile force to act on said tie bars to clamp together a mold comprising a fixed mold fitted to said fixed platen and a movable mold fitted to said movable platen and
a side pusher comprising a pair of supports respectively arranged between adjacent two tie bars out of said plurality of tie bars at positions symmetrical to each other and slidably supported to said tie bars, a moving and positioning means linking said supports to said fixed platen or movable platen and moving said supports to be positioned at a predetermined position and a lateral clamping means provided on each of said pair of supports to push a side face of said fixed mold or movable mold.

2. A mold clamping apparatus comprising:
a fixed platen fixed to a base,
a movable platen arranged, being opposed to said fixed platen, to be movable forward and backward,
a plurality of tie bars making said fixed platen and movable platen linkable to each other,
a mold clamping means causing a tensile force to act on said tie bars to clamp together a mold comprising a fixed mold fitted to said fixed platen and a movable mold fitted to said movable platen and
a side pusher comprising a quadrangular frame formed by two vertical members forming a mold right side and left side pair and upper and lower two horizontal members, said vertical members having their respective end portions pin-jointed with respective end portions of said horizontal members, said frame being arranged surrounding said plurality of tie bars with a small gap being maintained between said frame and said plurality of tie bars, a moving and positioning means linking said frame to said fixed platen or movable platen and moving said frame to be positioned at a predetermined position and a lateral clamping means provided on each of said two vertical members to push a side face of said fixed mold or movable mold.

3. A mold clamping apparatus as claimed in claim 1, wherein at least one pair of said lateral clamping means, being opposed to each other, are provided on respective central portions of said pair of supports.

4. A mold clamping apparatus as claimed in claim 1, wherein said lateral clamping means is constructed by one of a hydraulic cylinder, electric type screw jack, toggle device and cam mechanism.

5. A mold clamping apparatus as claimed in claim 1, wherein said lateral clamping means is constructed by a hydraulic cylinder comprising a cylinder rod so that a side face of said mold is pushable by a terminal end portion of said cylinder rod.

6. A mold clamping apparatus as claimed in claim 1, wherein said side pusher is constructed movably between a predetermined lateral clamping position where the side face of said mold is pushed by said lateral clamping means and a stand-by position near said fixed platen or movable platen side where said side pusher is retracted from said lateral clamping position so as not to obstruct a mold exchange work.

7. A mold clamping apparatus as claimed in claim 6, wherein said side pusher has such a width directional size that said side pusher is received more on said fixed platen or movable platen side than a mold fitting face of said fixed platen or movable platen or a mold fitting face of a mold fixing member fitted to said fixed platen or movable platen.

8. A mold clamping apparatus as claimed in claim 1, wherein one or both of said fixed platen and movable platen include a die plate comprising a wall portion, projection projecting from said wall portion, mold fixing portion of a terminal end of said projection and plurality of ribs connecting between said projection and wall portion.

9. An injection molding machine comprising an injection unit and mold clamping apparatus, wherein said mold clamping apparatus is a mold clamping apparatus as claimed in claim 1.

10. An injection molding method using a mold clamping apparatus as claimed in claim 1, comprising the steps of:

carrying out a mold clamping by the mold clamping means of said mold clamping apparatus so that the mold comprising said fixed mold and movable mold is clamped together at a mold mating face and pushing both side faces of said fixed mold or movable mold of the mold so clamped by said side pusher so that said fixed mold or movable mold is laterally clamped and, in this state, injecting a molten resin into a mold cavity from an injection unit so that an injection molded article is produced.

11. A mold clamping apparatus as claimed in claim 2, wherein at least one pair of said lateral clamping means, being opposed to each other, are provided on respective central portions of said two vertical members.

12. A mold clamping apparatus as claimed in claim 2, wherein said lateral clamping means is constructed by one of a hydraulic cylinder, electric type screw jack, toggle device and cam mechanism.

13. A mold clamping apparatus as claimed in claim 3, wherein said lateral clamping means is constructed by one of a hydraulic cylinder, electric type screw jack, toggle device and cam mechanism.

14. A mold clamping apparatus as claimed in claim 2, wherein said lateral clamping means is constructed by a hydraulic cylinder comprising a cylinder rod so that a side face of said mold is pushable by a terminal end portion of said cylinder rod.

15. A mold clamping apparatus as claimed in claim 3, wherein said lateral clamping means is constructed by a hydraulic cylinder comprising a cylinder rod so that a side face of said mold is pushable by a terminal end portion of said cylinder rod.

16. A mold clamping apparatus as claimed in claim 2, wherein said side pusher is constructed movably between a predetermined lateral clamping position where the side face of said mold is pushed by said lateral clamping means and a stand-by position near said fixed platen or movable platen side where said side pusher is retracted from said lateral clamping position so as not to obstruct a mold exchange work.

17. A mold clamping apparatus as claimed in claim 3, wherein said side pusher is constructed movably between a predetermined lateral clamping position where the side face of said mold is pushed by said lateral clamping means and a stand-by position near said fixed platen or movable platen side where said side pusher is retracted from said lateral clamping position so as not to obstruct a mold exchange work.

18. A mold clamping apparatus as claimed in claim 4, wherein said side pusher is constructed movably between a predetermined lateral clamping position where the side face of said mold is pushed by said lateral clamping means and a stand-by position near said fixed platen or movable platen side where said side pusher is retracted from said lateral clamping position so as not to obstruct a mold exchange work.

19. A mold clamping apparatus as claimed in claim 5, wherein said side pusher is constructed movably between a predetermined lateral clamping position where the side face of said mold is pushed by said lateral clamping means and a stand-by position near said fixed platen or movable platen side where said side pusher is retracted from said lateral clamping position so as not to obstruct a mold exchange work.

20. A mold clamping apparatus as claimed in claim 2, wherein one or both of said fixed platen and movable platen include a die plate comprising a wall portion, projection projecting from said wall portion, mold fixing portion of a terminal end of said projection and plurality of ribs connecting between said projection and wall portion.

* * * * *

UNITED STATES PATENT AND TRADEMARK OFFICE
CERTIFICATE OF CORRECTION

PATENT NO. : 7,491,051 B2
APPLICATION NO. : 11/667679
DATED : February 17, 2009
INVENTOR(S) : Hiroto Matsushita et al.

It is certified that error appears in the above-identified patent and that said Letters Patent is hereby corrected as shown below:

<u>Title Page, item (86) PCT No.:</u>

The line reading "PCT/JP2006/008186" should read --PCT/JP2006/308186--.

Signed and Sealed this

Twenty-eighth Day of July, 2009

JOHN DOLL
*Acting Director of the United States Patent and Trademark Office*